United States Patent [19]
Gilberg et al.

[11] Patent Number: 4,933,898
[45] Date of Patent: Jun. 12, 1990

[54] SECURE INTEGRATED CIRCUIT CHIP WITH CONDUCTIVE SHIELD

[75] Inventors: Robert C. Gilberg; Richard M. Knowles, both of San Diego; Paul Moroney, Cardiff-by-the-Sea; William A. Shumate, San Diego, all of Calif.

[73] Assignee: General Instrument Corporation, New York, N.Y.

[21] Appl. No.: 297,472

[22] Filed: Jan. 12, 1989

[51] Int. Cl.$^5$ .......................... G11C 7/00; G06F 13/00
[52] U.S. Cl. ......................... 365/53; 365/63; 365/226; 365/225.7; 307/202.1; 380/3; 357/85
[58] Field of Search ..................... 365/52, 53, 63, 218, 365/228, 225.7, 226; 307/202.1; 357/85; 340/652; 380/3, 4

[56] References Cited

U.S. PATENT DOCUMENTS

| | | | |
|---|---|---|---|
| 3,882,323 | 5/1975 | Smolker | 307/202.1 |
| 4,593,384 | 6/1986 | Kleijne | 365/228 |
| 4,811,288 | 3/1989 | Kleijne et al. | 365/52 |

FOREIGN PATENT DOCUMENTS

WO84/04614 11/1984 PCT Int'l Appl.

Primary Examiner—Joseph A. Popek
Attorney, Agent, or Firm—Edward W. Callan

[57] ABSTRACT

An integrated circuit chip containing a secure area in which secure data is processed and/or stored, includes a semiconductive layer containing diffusions defining circuit element components; a first conductive layer coupled to the semiconductive layer to interconnect the components to thereby define circuit elements for distributing, storing processing and/or affecting the processing of secure data; and a second conductive layer overlying the circuit elements to thereby define a secure area in which the circuit elements are shielded from inspection, and coupled to the circuit elements for conducting to the circuit elements a predetermined signal that is essential to an intended function of the shielded circuit elements, whereby removal of the second conductive layer will prevent the predetermined essential signal from being provided to the circuit elements and thereby prevent the intended function.

25 Claims, 5 Drawing Sheets

SECURE INTEGRATED CIRCUIT CHIP WITH CONDUCTIVE SHIELD

BACKGROUND OF THE INVENTION

The present invention generally pertains to integrated circuit chips for electronic data processing systems and is particularly directed to preventing inspection and/or modification of secure data that is stored or processed within a secure area of an integrated circuit chip.

Integrated circuit chips that process and store secure data include a secure area containing circuit elements for processing and storing the secure data, and a nonsecure area containing circuit elements for processing and storing nonsecure data and control signals. An integrated circuit chip contains a semiconductive layer containing diffusions defining circuit element components; and a first conductive layer coupled to the semiconductive layer to interconnect the components to thereby define the circuit elements. All modern integrated circuit chips include one or more conductive layers, typically for interconnecting circuit elements and components thereof. Generally these layers are used for both control signal and power signal distribution in a way that is intended to maximize signal interconnection density and reduce the area required for such interconnections.

The secure area further contains circuit elements for transferring nonsecure data and control signals to a data bus within the secure area for processing with the secure data by data processing circuit elements within the secure area. Logic circuit elements within the secure area enable the nonsecure data and the control signals to be transferred between the nonsecure area and the data bus within the secure area in response to control signals generated by the data processing circuit elements within the secure area.

Nevertheless, even though the secure data cannot be readily transferred in such an integrated circuit chip from the secure area to the nonsecure area, it is possible to gain access to secure data stored or being processed within the secure area by inspecting the secure area with such diagnostic tools as a scanning electron microscope (SEM) or a probe that couples an oscilloscope to a given node within the secure area from which the secure data can be accessed. Also, by delivering appropriate control signals to the logic circuit elements within the secure area by such means as a probe, it may be possible to cause the logic circuit to enable transfer of secure data to the nonsecure area from a data bus within the secure area that carries both nonsecure and secure data for processing by the data processing circuit elements within the secure area or to enable the secure data stored within the secure area to be replaced by clandestine data that would enable the intended security of the chip to be compromised.

SUMMARY OF THE INVENTION

The present invention provides an integrated circuit chip containing a secure area in which secure data is processed and/or stored, comprising a semiconductive layer containing diffusions defining circuit element components; a first conductive layer coupled to the semiconductive layer to interconnect the components to thereby define circuit elements for distributing, storing, processing and/or affecting the processing of secure data; and a second conductive layer overlying the circuit elements to thereby define a secure area in which the circuit elements are shielded from inspection, and coupled to the circuit elements for conducting to the circuit elements a predetermined signal that is essential to an intended function of the shielded circuit elements, whereby removal of the second conductive layer will prevent the predetermined essential signal from being provided to the circuit elements and thereby prevent the intended function.

In one aspect of the present invention, the predetermined signal is a power signal. In one embodiment according to this aspect of the invention the shielded circuit elements of the first conductive layer include a volatile memory, such as a volatile random access memory (RAM), for storing secure data, with the memory being powered by the predetermined power signal, whereby removal of the second conductive layer to enable inspection of the memory will result in power being removed from the memory. Since the memory is volatile, removal of power therefrom results in deletion of the secure data stored therein.

In one such embodiment, each of a plurality of such volatile memories within the first conductive layer is separately coupled to only that portion of the second conductive layer that overlies such memory for receiving the predetermined power signal from only that overlying portion of the second conductive layer, whereby removal of only those portions of the second conductive layer as overlie the memories for the purpose of inspecting the memories will be unavailing since power is removed from each memory that is uncovered by such removal.

In an integrated circuit chip according to the invention that further contains a nonsecure area in which nonsecure data and control signals are processed and/or stored, and wherein the shielded circuit elements include logic circuit elements for enabling transfer of nonsecure data and/or control signals between the secure area and the nonsecure area, the shielded logic circuit elements are powered by the predetermined power signal provided by the second conductive layer, whereby removal of the second conductive layer in order to allow control signals to be delivered to the logic circuit elements by such means as a probe for enabling secure data to be transferred from the secure area to the nonsecure area of the chip will be unavailing since such removal of the second conductive layer also removes power from the logic circuit elements. In such an embodiment, each of a plurality of the shielded logic circuit elements is separately coupled to only that portion of the second conductive layer that overlies such logic circuit element for receiving the predetermined power signal from only that overlying portion of the second conductive layer.

According to another aspect of the present invention the shielded circuit elements include a memory for storing secure data and a logic circuit for enabling data to be stored in the memory, and the second conductive layer conducts a signal that is essential to the enabling function of the logic circuit. Thus removal of the second conductive layer in order to deliver control signals to the logic circuit that would enable clandestine data to be substituted in the memory for the secure data to thereby compromise the intended security of the chip would be unavailing since removal of the second conductive layer prevents the logic circuit from enabling data to be stored in the memory.

Additional features of the present invention are described in relation to the description of the preferred embodiments.

DESCRIPTION OF THE PREFERRED EMBODIMENTS

Figure 1:
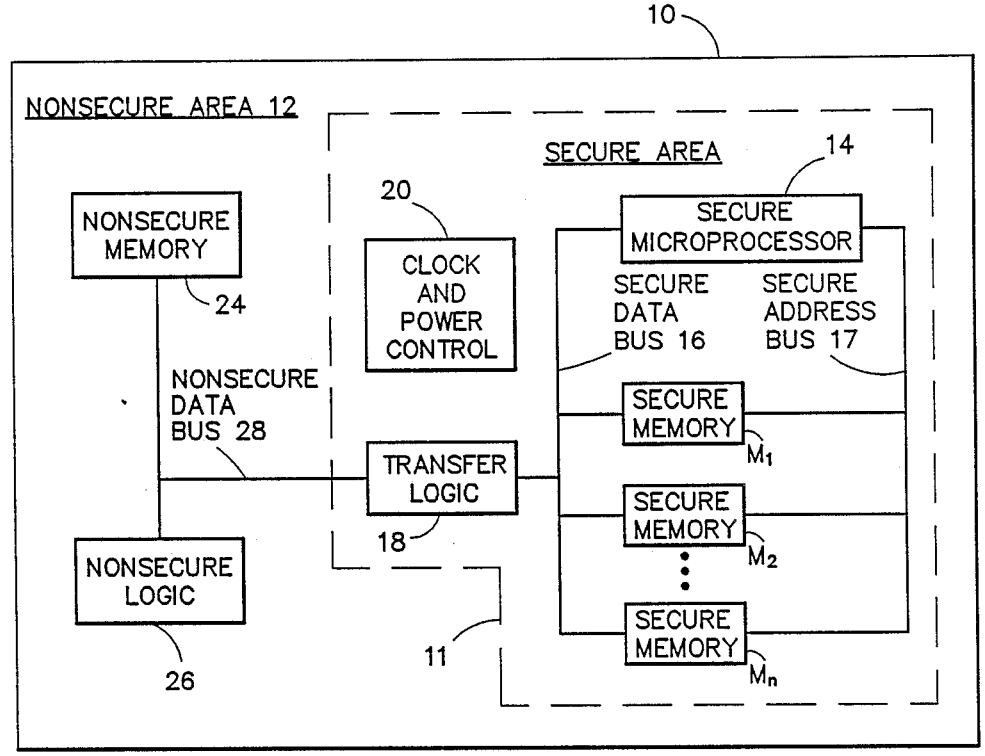
FIG. 1 is a block diagram of an integrated circuit chip according to the present invention.

Referring to FIG. 1, a preferred embodiment of the integrated circuit chip 10 of the present invention includes a secure area 11 and a nonsecure area 12. The chip 10 is a VLSI (Very Large Scale Integrated) circuit chip. Within the secure area 11, the chip 10 defines the following circuit elements: a microprocessor 14 for processing secure data, a plurality of memories $M_1$, $M_2$, $M_n$ for storing secure data, a secure data bus 16, a secure address bus 17, transfer logic circuits 18, and secure clock and power control circuits 20. The chip 10 need not be limited to such a specific mixture of circuit elements, but may contain any mixture of circuit elements wherein secure data is to be either protected against unauthorized attacks of reading out or modification of secure data and/or instructions. The memories $M_1$, $M_2$, $M_n$ can be of any type, to wit: RAM (random-access memory), ROM (read-only memory), EPROM (electrically programmable ROM) EEPROM: (electrically erasable programmable ROM) and others, such as register files, FIFO (first-in/first-out) buffers, etc.

A conductive layer $CN_2$ covers the circuit elements 14, $M_1$, $M_2$, $M_n$, 16, 17, 18, 20 to shield such circuit elements from inspection, and thereby defines the secure area 11.

Within the nonsecure area 12, the chip 10 defines the following circuit elements: a memory 24, a logic circuit 26 and a nonsecure data bus 28.

Figure 2:
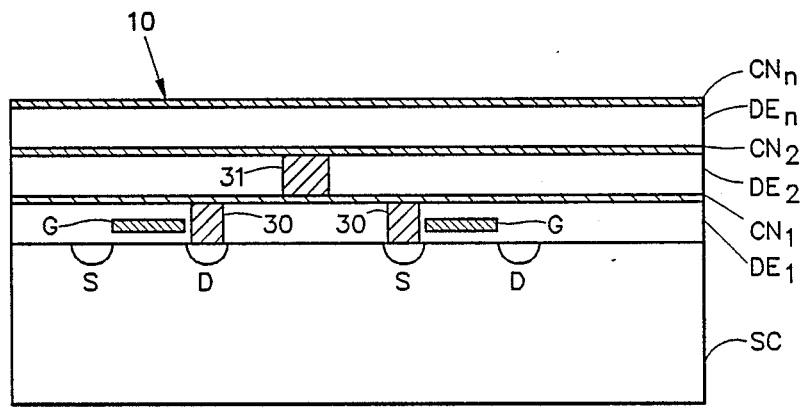
FIG. 2 is a cross-sectional view illustrating the shielding of MOS circuit element components in an integrated circuit chip according to the present invention.
Figure 3:
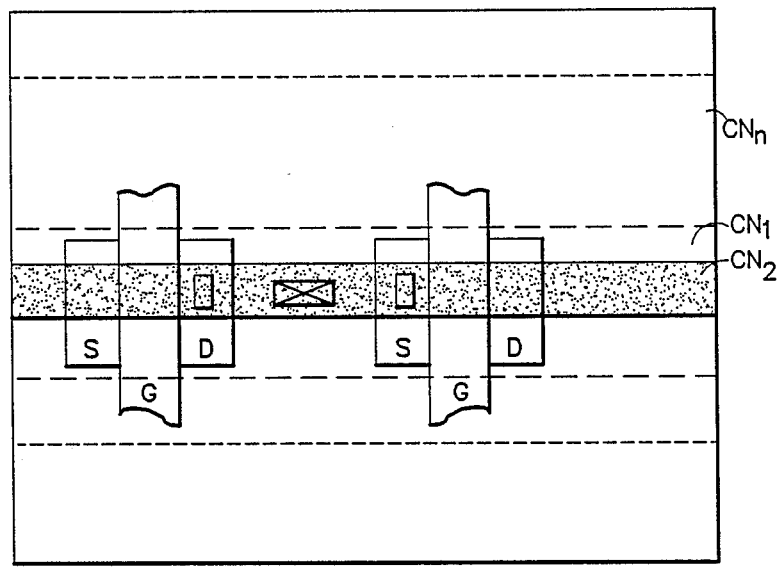
FIG. 3 is a plan view illustrating the use of an overlying conductive layer to shield circuit element components and to conduct a predetermined signal to shielded MOS circuit elements.

In an embodiment of the chip 10 including MOS circuit elements, as illustrated in FIGS. 2 and 3, the chip includes a semiconductive subtrate layer SC, a first dielectric layer $DE_1$, a first conductive layer $CN_1$, a second dielectric layer $DE_2$, a second conductive layer $CN_2$, an nth dielectric layer $DE_n$, and an nth conductive layer $CN_n$. Diffusions S and D in the semiconductive substrate layer SC define sources and drains, which are combined with gate conductors G and interconnected by the first conductive layer $CN_1$ to define complementary MOS field effect transistors that are arrayed to define the circuit elements of the chip 10. The first conductive layer $CN_1$ is coupled to a source S and a drain D by conductive contacts 30 through holes in the first dielectric layer $DE_1$. The second conductive layer $CN_2$ is coupled to the first conductive layer $CN_1$ by a contact 31 through a hole in the second dielectric layer $DE_2$ for conducting to the circuit elements a predetermined signal that is essential to an intended function of the shielded circuit elements.

Removal of the second conductive layer $CN_2$ will prevent the predetermined essential signal from being provided to the circuit elements and thereby prevent the intended function. The second conductive layer $CN_2$ overlies the circuit elements to thereby define the secure area 11 in which the circuit elements are shielded from inspection.

Figure 4:
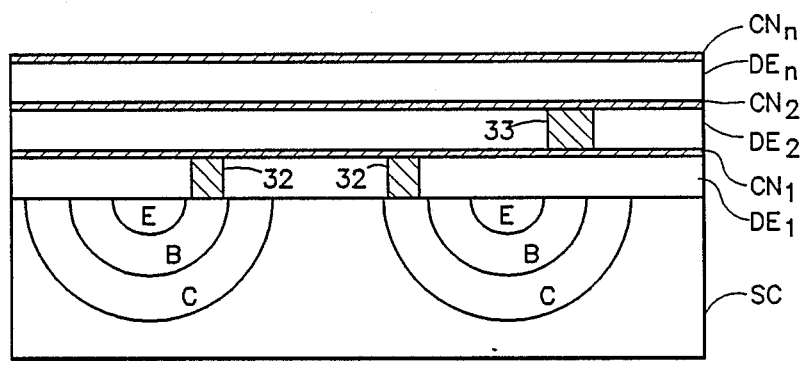
FIG. 4 is a cross-sectional view illustrating the shielding of bipolar circuit element components in an integrated circuit chip according to the present invention.

In an embodiment of the chip 10 including bipolar circuit elements, as illustrated in FIG. 4, the chip includes a semiconductive substrate layer SC, a first dielectric layer $DE_1$, a first conductive layer $CN_1$, a second dielectric layer $DE_2$, a second conductive layer $CN_2$, an nth dielectric layer $DE_n$, and an nth conductive layer $CN_n$. Diffusions C, B and E in the semiconductive layer SC define collectors, bases and emitters which are interconnected by the first conductive layer $CN_1$ to define bipolar transistors that are arrayed to define the circuit elements of the chip 10. The first conductive layer $CN_1$ is coupled to a collector C and a base B by conductive contacts 32 through holes in the first dielectric layer $DE_1$ for conducting to the circuit elements a predetermined signal that is essential to an intended function of the shielded circuit elements. The second conductive layer $CN_2$ is coupled to the first conductive layer $CN_1$ by a contact 33 through a hole in the second dielectric layer $DE_2$ for conducting to the circuit elements a predetermined signal that is essential to an intended function of the shielded circuit elements.

Removal of the second conductive layer $CN_2$ will prevent the predetermined essential signal from being provided to the circuit elements and thereby prevent the intended function. The second conductive layer $CN_2$ overlies the circuit elements to thereby define the secure area 11 in which the circuit elements are shielded from inspection.

All circuit elements of the chip 10 that distribute, store, process or affect the processing of secure data utilize conductive layers, such as the interconnect layer $CN_1$, that are fabricated before and lie under the conductive layer, such as layer $CN_2$, which functions as a shield and thereby defines the boundaries of the secure area 11.

The second conductive layer $CN_2$ acts both as a shield to mechanical and SEM probing and as a predetermined essential signal carrying layer that cannot be removed without rendering the underlying circuit elements inoperable. The predetermined essential signal may be either a power signal or a control signal, such as an instruction. When the predetermined essential signal is a power signal, removal of the shield layer $CN_2$ by either mechanical, chemical or other means for inspection purposes will then remove power from the underlying circuit elements, rendering them inoperable and also possibly forcing the same circuit elements to lose any data or logic state stored therein.

Figure 5:
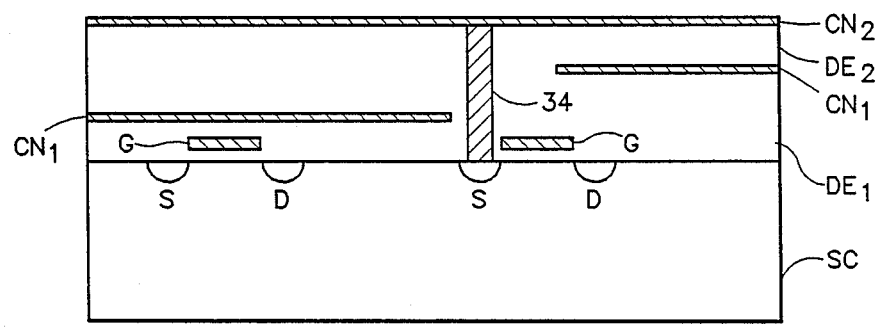
FIG. 5 is a cross-sectional view illustrating the use of an overlying conductive layer to shield circuit elements and to conduct power to the shielded circuit elements.

This technique is particularly effective for protecting secure data stored in a volatile memory, such as a volatile RAM. In an embodiment of the chip 10 in which the memories $M_1$ and $M_2$ are volatile memories, each of such memories $M_1$, $M_2$ is covered by the second conductive layer $CN_2$ to shield the memories $M_1$, $M_2$ from inspection; and a power signal is separately distributed to each of the memories $M_1$, $M_2$ from the portion of the second conductive layer $CN_2$ that overlies the respective memory $M_1$, $M_2$. Such distribution is shown in FIG. 5, wherein the second conductive layer $CN_2$ is connected by a contact 34 to the source S of a transistor included in a volatile memory for providing power to the memory. Removal of the overlying portion of the second conductive layer $CN_2$ to enable inspection of the respective memory $M_1$, $M_2$ results in power being removed from the respective memory $M_1$, $M_2$. Since the memory $M_1$, $M_2$ is volatile, removal of power therefrom results in deletion of the secure data stored therein. Accordingly, an attempt to inspect the contents of either of the memories $M_1$, $M_2$ by removing only the portion of the second conductive layer $CN_2$ that overlies such memory will be unavailing.

Figure 6:
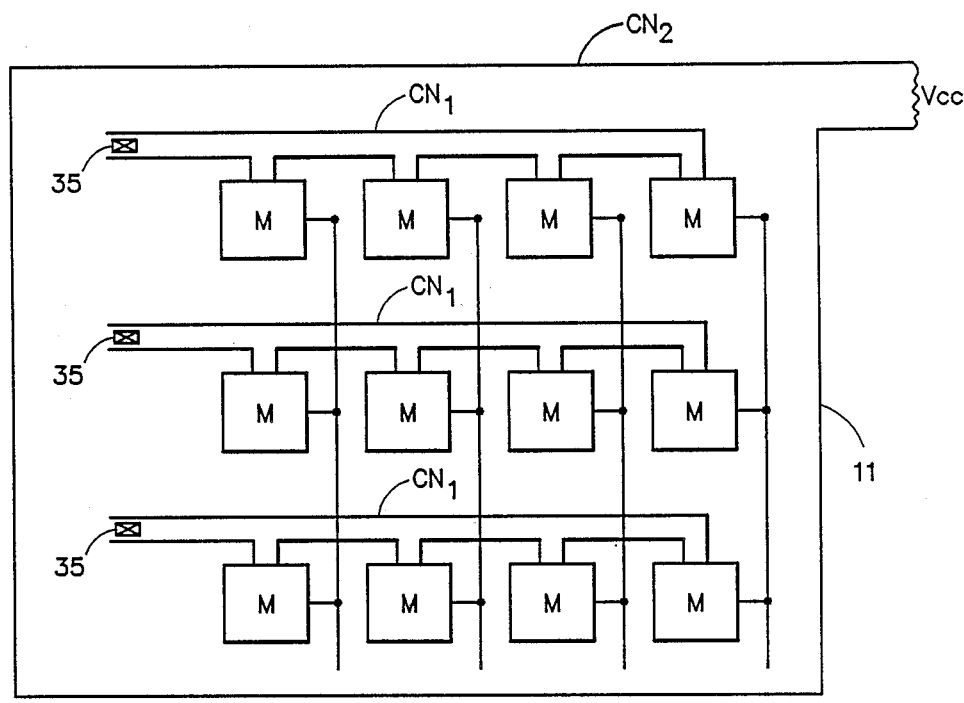
FIG. 6 is a block diagram illustrating an alternative preferred embodiment for shielding of a plurality of volatile memories.

In an alternative embodiment shown in FIG. 6, power signals $V_{cc}$ are distributed from the second conductive layer $CN_2$ to a plurality of volatile memory elements M in a manner that takes up less space than in the embodiment described above, in which power is separately distributed to each of the memory elements M from only that portion of the second conductive layer as overlies such memory element M. In this embodiment each row of memory elements M receives power from the overlying second conductive layer $CN_2$ via a separate underlying first conductive layer $CN_1$. The second conductive layer $CN_2$ is connected to the respective first conductive layers $CN_1$ by conductive contacts 35. Although this embodiment does trade off some security for area efficiency, an attempt to inspect these memory elements M without causing the data to be deleted by a power loss resulting from removal of the second conductive layer $CN_2$ would require very high resolution removal of the second conductive layer $CN_2$ while leaving intact all interlayer conductive contacts 35 and the portion of the second conductive layer $CN_2$ that distributes power to these contacts 35.

Any combination of conductive layers may be used in this embodiment. The use of the conductive layers most highly embedded within the vertical dimension of the chip as the shielding conductive layers results in the greatest security.

Referring again to FIG. 1, within the nonsecure area 12, the logic elements 26 and the memory 24 process and store nonsecure data and control signals. The nonsecure data and control signals are transferred from the nonsecure data bus 28 to the secure data bus 16 in the secure area 11 by the transfer logic circuit 18. The transfer logic circuit 18 transfers the nonsecure data and control signals to the secure data bus 16 within the secure area 11 for processing with the secure data by the microprocessor 14. The transfer logic circuit 18 enables the nonsecure data and the control signals to be transferred between the nonsecure data bus 28 and the secure data bus 16 in response to control signals generated by the microprocessor 14 that indicate when nonsecure data is present on the secure data bus 16. The microprocessor 14 monitors the status of the data signals on the secure data bus 16, and generates the control signals that enable the logic circuit 18 to transfer data signals and control signals between the nonsecure data bus 28 and the secure data bus 16 only during such times as nonsecure data is present on the secure data bus 16.

As described above, the conductive layer $CN_2$ overlies the transfer logic circuit 18 in order to shield the transfer logic circuit from inspection. The conductive layer $CN_2$ also conducts a power signals to the transfer logic circuit 18, whereby removal of the conductive layer $CN_2$ for the purpose of inspecting the transfer logic circuit 18 results in power being removed from the transfer logic circuit 18 and prevents the transfer logic circuit 18 from transferring any data or control signals between the secure data bus 16 and the nonsecure data bus 28. Likewise, removal of the conductive layer $CN_2$ in order to allow control signals to be delivered to the transfer logic circuit 18 by such means as a probe for enabling secure data to be transferred from the secure area 11 to the nonsecure area 12 of the chip 10 will be unavailing since such removal of the shielding conductive layer $CN_2$ also removes power from the transfer logic circuit 18.

This technique may be extended in the reverse direction, so that clandestine data cannot be written into a secure memory $M_1$, $M_2$, $M_n$ from the nonsecure area 12. The microprocessor 14 provides memory access logic circuit, which enables data on the secure data bus 16 to be stored in the memories $M_1$, $M_2$, $M_n$; and the shielding conductive layer $CN_2$ conducts a power signal to the microprocessor 14. Thus removal of the shielding conductive layer $CN_2$ in order to deliver control signals to the memory access logic circuit of the microprocessor 14 that would enable clandestine data to be substituted in the memories $M_1$, $M_2$, $M_n$ for the secure data to thereby compromise the intended security of the chip would be unavailing since removal of the shielding conductive layer $CN_2$ removes power from the microprocessor 14 and thereby prevents the memory access logic circuit therein from enabling data to be stored in the memories $M_1$, $M_2$, $M_n$.

In one embodiment, each of the shielded logic circuits 14, 18 in the secure area is separately coupled to only that portion of the shielding conductive layer $CN_2$ that overlies such logic circuit 14, 18 for receiving a power signal from only that overlying portion of the shielding conductive layer $CN_2$.

Figure 7:
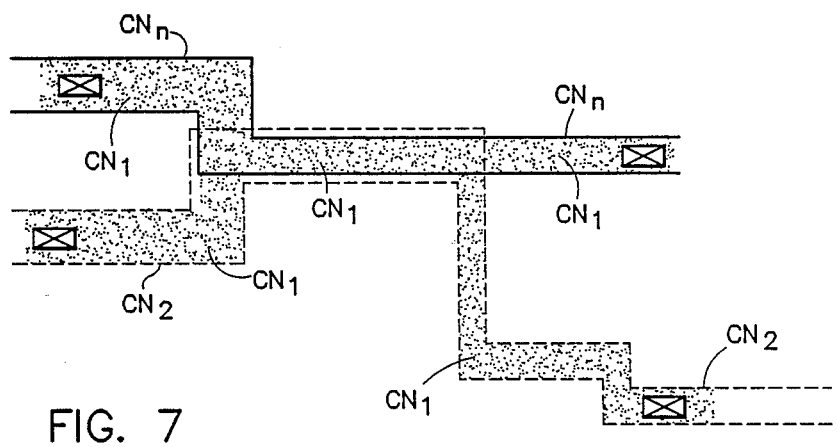
FIG. 7 is a plan view illustrating the use of an overlying conductive layer to carry a signal essential to the function of a circuit element.

In an embodiment shown in FIG. 7, a secure signal is distributed in a conductive layer $CN_1$ that underlies shield layers $CN_2$ and $CN_n$, and shielding signals (such as essential control or power signals) are distributed in the overlying shield layers $CN_2$ and $CN_n$ respectively. The boundaries of one shielding conductive layer $CN_n$ are shown in the drawing by solid lines, the boundaries of the other shielding conductive layer $CN_2$ are shown in the drawing by dashed lines, and the underlying conductive layer $CN_1$ is shown in the drawing by shading. The underlying conductive layer $CN_1$ is entirely shielded by either one or the other of the shielding conductive layers $CN_2$ and $CN_n$; and one portion of the underlying conductive layer $CN_1$ is shielded by both of the shielding conductive layers $CN_2$ and $CN_n$.

An attempt at cutting through the shield layers $CN_2$ and $CN_n$ with chemicals or conventional lasers or microprobes to gain access to the secure signal in the conductive layer $CN_1$ results either in the conductive layer $CN_1$ becoming connected (shorted) to the shield layers $CN_2$ and $CN_n$ or in an open circuit being created in the circuit paths defined by the conductive layers $CN_1$, $CN_2$ and $CN_n$, which thereby disrupts distribution of the secure signal and the essential signals and alters the intended functions of the circuit elements connected to the conductive layers $CN_1$, $CN_2$ and $CN_n$ so as to impair the intended function of the chip 10.

It is critically important that certain secure data stored in the chip 10 during formation of a product that includes the chip not be modified after the storage of such secure data. To accomplish this purpose the chip 10 includes a system for preventing the alteration of secure data stored in a predetermined memory location. Alternative embodiments of such a prevention system are shown in FIGS. 8 and 9.

Figure 8:
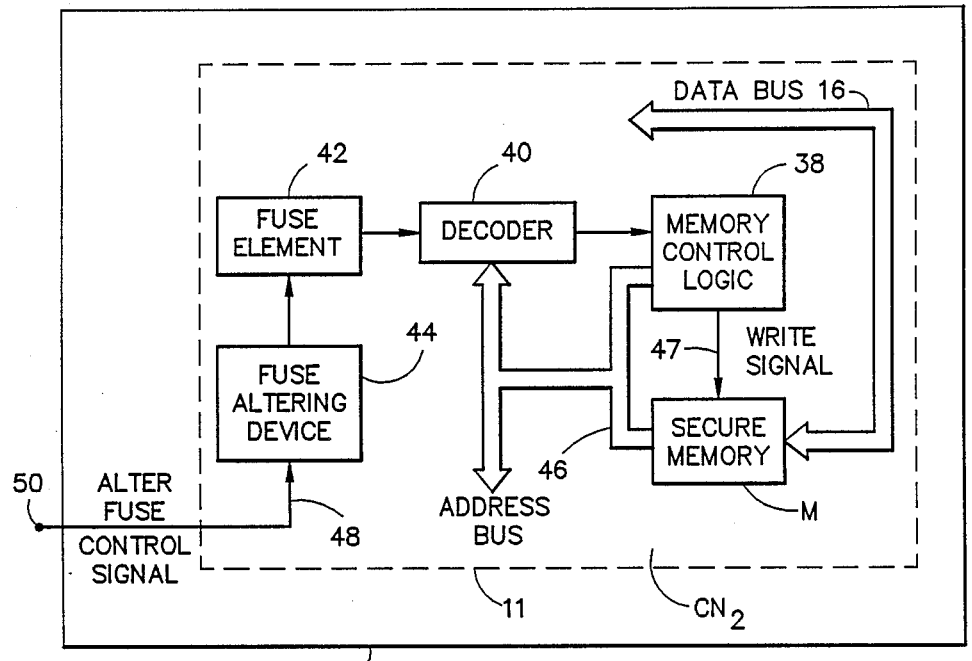
FIG. 8 is a block diagram of one preferred embodiment of a system in the secure area of the chip for preventing the alteration of secure data stored in a predetermined memory location.
Figure 9:
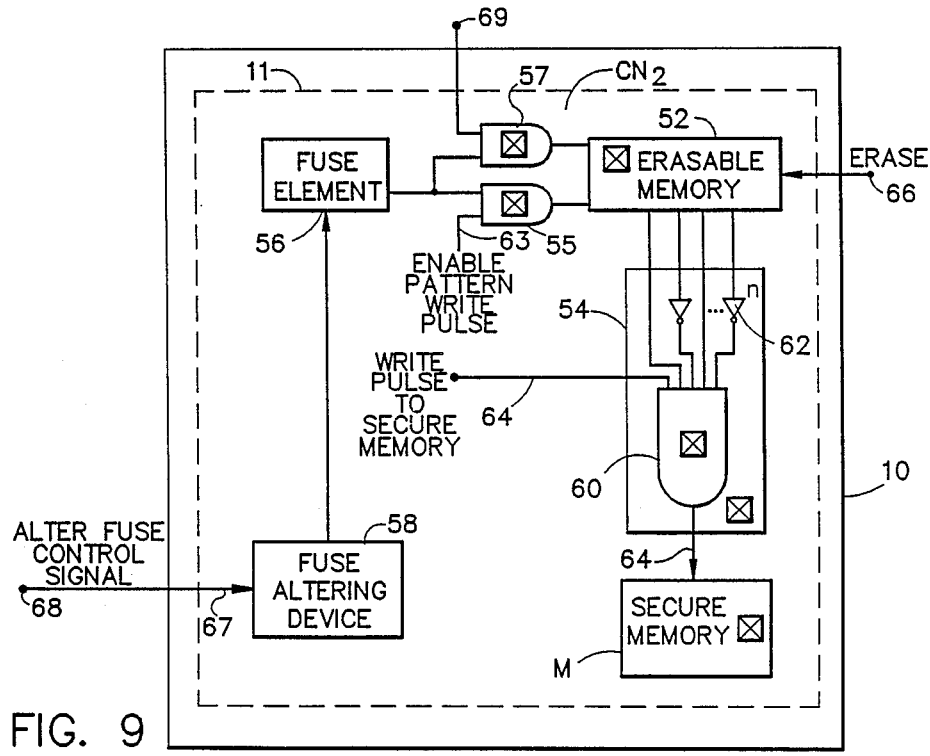
FIG. 9 is a block diagram of an alternative preferred embodiment of a system in the secure area of the chip for preventing the alteration of secure data stored in a predetermined memory location.

The system of FIG. 8 includes a memory M, a memory control logic circuit 38, a decoder 40, a fuse element 42 and a fuse altering device 44. This system is applicable to and includes as the memory M, each of the memories $M_1$, $M_2$, $M_n$ in which secure data is stored.

The memory M has plurality of memory locations, with a predetermined location being for the storage of unalterable secure data from the data bus 16.

The memory control logic circuit 38 is coupled to the memory M by an address bus 46 for causing data to be stored in locations of the memory M indicated by address signals provided on the address bus 46 when a "write" signal is provided on line 47 from the memory control logic circuit 38 to the secure memory M.

The fuse element 42 has an initial state and an irreversibly altered state. The term "fuse element" refers to both fuses and antifuses. Fuse elements are formed in the chip 10 by the combination of a metallic conductive layer and a polysilicon conductive layer. Antifuse elements can be formed in the chip by metallic conductive layers, polysilicon conductive layers or a combination of both. Antifuse elements are formed by $P+/N+$ semiconductor junction diodes and $P-/N-$ semiconductor junction diodes formed in a semiconductive layer of the chip by conductor/oxide conductor structures or by conductor/amorphous silicon/conductor structures in the chip.

The fuse altering device 44 is coupled to the fuse element 42 for irreversibly altering the state of the fuse element 42 in response to a predetermined control signal received on line 48 from a terminal 50 that is external to the secure area 11. Alternatively, the control signal on line 48 is received from a terminal (not shown) that is internal to the secure area 11.

The decoder 40 is coupled to the fuse element 42, the memory control circuit 38 and the address bus 46 for monitoring the state of the fuse element 42 and the address signals on the address bus 46, and for preventing the memory control circuit 38 from causing data to be stored in the predetermined memory location of the memory M after the state of the fuse element 42 has been altered irreversibly whenever the predetermined memory location is indicated by an address signal on the address bus 46.

The second conductive layer $CN_2$ shields the the memory M, the memory control logic circuit 38, the decoder 40, and the fuse element 42 from direct external access.

The memory M, the memory control logic circuit 38 and the decoder 40 are all coupled to the second conductive layer $CN_2$ so as to be powered by the power signal carried by the second conductive layer $CN_2$.

The system of FIG. 8 is used to prevent the alteration of secure data initially stored in the predetermined locations of the memory M. Once the state of the fuse element 42 is irreversibly changed, the decoder 40 prevents the writing of any further data into the predetermined memory locations indicated by the address signals on the address bus 46.

The fuse element 42 in the system of FIG. 8 also may be connected to other shielded circuit elements (not shown) that perform or affect certain preliminary secure data processing functions that are applicable only prior to such time as the product that includes the chip is distributed to users of the product, such as preliminary processing of the secure data or the loading of instructions for processing the secure data. Means, such as the decoder 40, are couple to the fuse element 42 and such other shielded circuit elements for monitoring the state of the fuse element and for preventing the intended function of such other shielded circuit element after the state of the fuse element has been altered irreversibly.

Many fuse technologies allow fusing only at a foundry during the secure integrated circuit chip fabrication process. For example, certain foundries may require that an oxide be grown over a polysilicon (or other fuse material) after the fuse has been flown to afford better long term device reliability. The system of FIG. 9 allows a separate manufacturer to load secure data into the secure memory M after foundry fusing, yet still prevents alteration of the contents of the memory M.

The system of FIG. 9 includes a memory M, an erasable memory 52, such as an EPROM or an EEROM (electrically erasable ROM), a memory control logic circuit 54, an enabling circuit 55, a fuse element 56, and AND gate 57 and a fuse altering device 58. The memory control logic circuit 54 includes an AND gate 60, and N connections including wiring and inverters 62 that couple the AND gate 60 to the erasable memory 52. The inverters 62 are connected between selected inputs to the AND gate 60 and selected memory locations in the erasable memory 52 so as to define a predetermined data pattern in the erasable memory 52 that must be present to enable the AND gate 60.

The memory M has a plurality of memory locations, with a predetermined location being for the storage of unalterable secure data.

The enabling circuit 55 enables a data pattern to be stored in the erasable memory 52 when a write enable signal is applied on line 63 to the enabling circuit 55.

The memory control logic circuit 54 couples the memory M to the erasable memory 52 in such a manner as to cause data to be stored in the predetermined location of the first memory M in response to a write signal on line 64 to the AND gate 60 whenever the erasable memory 52 contains a predetermined data pattern.

The contents of the erasable memory 52 may be erased by providing an "erase" control signal at an erase terminal 66 located outside the secure area 11 of the chip 10.

The fuse element 56 has an initial state and an irreversibly altered state. The fuse altering device 58 is coupled to the fuse element 56 for irreversibly altering the state of the fuse element 56 in response to a predetermined control signal received on line 67 from a terminal 68 that is external to the secure area 11. Alternatively, the control signal on line 67 is received from a terminal (not shown) that is internal to the secure area 11.

A data pattern is provided at a data terminal 69 and fed into the erasable memory through the AND gate 57. The AND gate 57 has one input connected to the fuse element 56 so as to enable data to be written into the erasable memory 52 only while the fuse element 56 is in its initial state.

The fuse element 56 also is coupled to the enabling circuit 55 so as to enable the predetermined data pattern to be stored in the erasable memory 52 only prior to the state of the fuse element 56 being irreversibly altered.

N bits of erasable memory 52 are required. At the foundry, the predetermined pattern of ones and zeros corresponding to the pattern of inverters 62 coupling the erasable memory 52 to the AND gate 60 is loaded into the erasable memory 52 to enable the AND gate 60 to pass a "write" control signal on line 64 to the memory M. After the predetermined pattern of ones and zeros is loaded into the erasable memory 52, the state of the fuse element 56 is irreversibly altered so that the predetermined pattern cannot be changed. At this point, processing and packaging of the integrated circuit chip 10 can continue, subject to the condition that the final processing and packaging steps do not disturb the stored predetermined pattern in the erasable memory 52.

After the chip 10 is shipped to a separate manufacturer, secure data can be stored in the secure memory M since the predetermined pattern stored in the erasable memory 52 matches the predetermined pattern hardwired into the memory control logic circuit 54 by the inverters 62.

Once the secure data is stored in the secure memory M, an "erase" signal is applied to the erase terminal 66 to erase the contents of the erasable memory 52 and thereby prevent alteration of the secure data stored in the secure memory M.

The second conductive layer CN₂ shields the the memory M, the erasable memory 52, the memory control logic circuit 54, the enabling circuit 55 and the fuse element 56 from direct external access.

This technique makes the system of FIG. 9 secure from any attack short of an extremely precise X-ray beam or other complex means that may be used to remotely reprogram the erasable memory 52 through the covering layers of the chip 10. The security of this technique relies on the fast it is difficult to remotely reprogram the contents of a an EEROM or EPROM, or to reconnect a blown fuse element. If a high power unfocused or diffuse X-ray or other means could essentially randomize the EEROM or EPROM contents, then an attacker could make repeated attempts to achieve the enabling pattern. Thus, security may also require that the EEROM or EPROM cells be designed to be biased in terms of their state, in other words, biased towards a preferred pattern of all ones or all zeros. Thus any unfocused beam would with high probability drive the contents to the preferred pattern, rather than to the predetermined pattern that enables data to be stored in the memory M. Security can also be increased by using a longer predetermined pattern, with a larger number N of bits.

The memory M, the erasable memory 52, the AND gate 60 and the enabling circuit 55 are all coupled to the second conductive layer CN₂ so as to be powered by the power signal carried by the second conductive layer $CN_2$.

The fuse element 56 in the system of FIG. 9 also may be connected to other shielded circuit elements (not shown) that perform or affect certain preliminary secure data processing functions that are applicable only prior to such time as the product that includes the chip is distributed to users of the product, such as preliminary processing of the secure data or the loading of instructions for processing the secure data. The fuse element 56 is coupled to such other shielded circuit element so as to enable the intended function of such other shielded circuit element only prior to the state of the fuse element being irreversibly altered.

The secure data alteration prevention systems of FIGS. 8 and 9 are the subject of a commonly assigned copending patent application, filed on even date herewith, entitled "Prevention of Alteration of Data Stored in Secure Integrated Circuit Chip Memory".

Manufacturing of complex integrated circuit chips requires complete access to the internal circuit elements during testing operations to insure that all included circuit elements work correctly. However, high accessibility for testing purposes generally is a security weakness for chips containing secure data or data which should not be modified.

Figure 10:
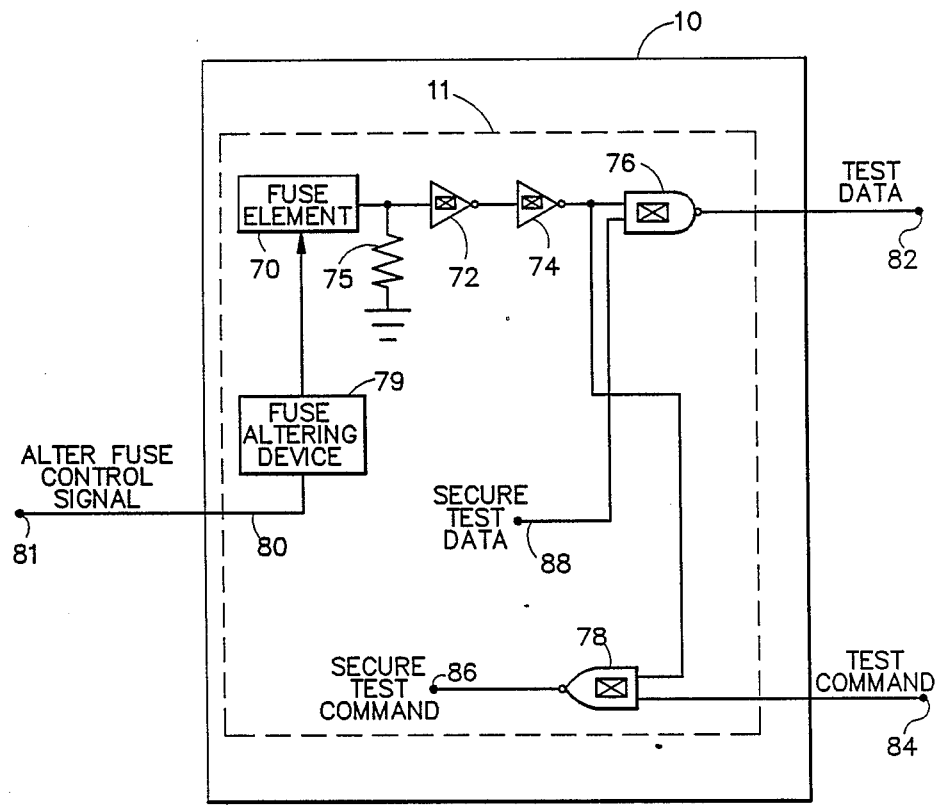
FIG. 10 is a block diagram of a preferred embodiment of a system in the secure area of the chip for limiting when the secure area may be accessed for testing.

FIG. 10 shows a system for permanently disabling test signal paths after testing operations are completed, so that no further access to internal secure circuit elements from the external pins of the chip is possible. This system includes a fuse element 70, first and second inverters 72, 74, a resistance 75, first and second NAND gates 76, 78 and a fuse altering device 79.

The fuse element 70 has an initial state and an irreversibly altered state. The fuse altering device 79 is coupled to the fuse element 70 for irreversibly altering the state of the fuse element 70 in response to a predetermined control signal received on line 80 from a terminal 81 that is external to the secure area 11. Alternatively, the control signal on line 80 is received from a terminal (not shown) that is internal to the secure area 11.

The fuse element 70 is coupled to the first and second NAND gates 76, 78 so as to enable the secure areas of the chip 10 to be accessed for testing only prior to the state of the fuse element 70 being irreversibly altered.

The fuse element 70 and the inverters 72, 74 are connected in series to one input to the first NAND gate 76. The output of the first NAND gate 76 is applied to an external test data output terminal 82.

The fuse element 70 and the inverters 72, 74 are also connected in series to one input to the second NAND gate 78.

The second NAND gate 78 passes a test command signal from an external test command input terminal 84 to a test command input node 86 within the secure area 11 of the chip 10. Test data is provided at internal test data output node 88 within the secure area 11 of the chip 10 in response to a test command input signal being provided to the internal test command input node 86. The test data provided at the internal test data output terminal may be accessed from the secure circuit elements of the chip 10, such as the circuit elements 14, $M_1$, $M_2$, $M_n$, 16, 17, 18, 20 (FIG. 1).

The test data is provided from the internal test data output node 88 through the first NAND gate 76 to the external test data output terminal 82 only while the fuse element 70 is in its initial state.

Also, the test command input signal is provided from the external test command input terminal 84 to the internal test command input node 86 only while the fuse is in its initial state.

The second conductive layer CN$_2$ shields the the fuse element 70, the inverters 72, 74, the resistor 75 and the NAND gates 76, 78 from direct external access.

The inverters 72, 74, the resistor 75 and the NAND gates 76, 78 are all coupled to the second conductive layer CN$_2$ so as to be powered by the power signal carried by the second conductive layer CN$_2$.

Additional protection is afforded by burying the signal paths from the fuse element 70 to the first and second NAND gates 76, 78 as far down into the chip 10 as possible to further preclude probe attacks. Therefore, the signal paths from the fuse element 70 to the first and second NAND gates 76, 78 are distributed primarily in an N+ or P+ diffusion. Polysilicon and other conductive layers may be used as well, with diminishing security. The use of the uppermost conductive layers CN$_n$ CN$_{n-1}$ should be avoided.

We claim:

1. An integrated circuit chip containing a secure area in which secure data is processed and/or stored, comprising
    a semiconductive layer containing diffusions defining circuit element components;
    a first conductive layer coupled to the semiconductive layer to interconnect the components to thereby define circuit elements for distributing, storing, processing and/or affecting the processing of secure data; and
    a second conductive layer overlying the circuit elements to thereby define a secure area in which the circuit elements are shielded from inspection, and coupled to the circuit elements for conducting to the circuit elements a predetermined signal that is essential to an intended function of the circuit elements, whereby removal of the second conductive layer will prevent the predetermined essential signal from being provided to the circuit elements and thereby prevent the intended function.

2. An integrated circuit chip according to claim 1, wherein the predetermined signal is a power signal.

3. An integrated circuit chip according to claim 2, wherein the shielded circuit elements include a volatile memory for storing secure data, with the memory being powered by the predetermined power signal.

4. An integrated circuit chip according to claim 3, wherein each of a plurality of the volatile memories is separately coupled to only that portion of the second conductive layer that overlies such memory for receiving the predetermined power signal from only that overlying portion of the second conductive layer.

5. An integrated circuit chip according to claim 2, further containing a nonsecure area in which nonsecure data and control signals are processed and/or stored, wherein the shielded circuit elements include logic circuit elements for enabling transfer of nonsecure data and/or control signals between the secure area and the nonsecure area, with the logic circuit elements being powered by the predetermined power signal.

6. An integrated circuit chip according to claim 5, wherein each of a plurality of the logic circuit elements is separately coupled to only that portion of the second conductive layer that overlies such logic circuit element for receiving the predetermined power signal from only that overlying portion of the second conductive layer.

7. An integrated circuit chip according to claim 2, wherein each of a plurality of the shielded circuit elements is separately coupled to only that portion of the second conductive layer that overlies the shielded circuit element for receiving the predetermined power signal from only that overlying portion of the second conductive layer.

8. An integrated circuit chip according to claim 1, wherein the shielded circuit elements of the first conductive layer include a memory for storing secure data and a logic circuit for enabling data to be stored in the memory, and wherein the second conductive layer conducts a signal that is essential to the enabling function of the logic circuit, whereby removal of the second conductive layer prevents data from being stored in the memory.

9. An integrated circuit chip according to claim 1, wherein the shielded circuit elements include
    a memory having a plurality of memory locations, with a predetermined location being for the storage of unalterable secure data;
    a memory control logic circuit coupled to the memory and an address bus for causing data to be stored in locations of the memory indicated by address signals provided on the address bus;
    a fuse element having an initial state and an irreversibly altered state;
    means coupled to the fuse element for irreversibly altering the state of the fuse element in response to a predetermined control signal; and
    a decoder coupled to the fuse element, the memory control circuit and the address bus for monitoring the state of the fuse element and said address signals, and for preventing the memory control circuit from causing data to be stored in the predetermined memory location after the state of the fuse element has been altered irreversibly whenever the predetermined memory location is indicated by an address signal on the address bus.

10. An integrated circuit chip according to claim 9, wherein the second conductive layer further shields the memory, the memory control logic circuit, the decoder, and the fuse element from direct external access.

11. An integrated circuit chip according to claim 9, wherein the predetermined signal is a power signal, with the memory, the memory control logic circuit and the decoder being powered by the predetermined power signal.

12. An integrated circuit chip according to claim 9, wherein the predetermined signal is a power signal, and wherein the memory is a volatile memory, with the memory being powered by the predetermined power signal.

13. An integrated circuit chip according to claim 1, wherein the shielded circuit elements include
    a first memory having a plurality of memory locations, with a predetermined location being for the storage of unalterable secure data;
    a second memory;
    means for enabling a data pattern to be stored in the second memory;
    a memory control logic circuit coupled to the first and second memories for causing data to be stored in the predetermined location of the first memory in response to a write signal whenever the second memory contains a predetermined data pattern;
    means coupled to the second memory for enabling the contents of the second memory to be erased;

a fuse element having an initial state and an irreversibly altered state; and means coupled to the fuse element for irreversibly altering the state of the fuse element in response to a predetermined control signal;

wherein the fuse element is coupled to the means for enabling a data pattern to be stored in the second memory so as to enable said data pattern storage only prior to the state of the fuse element being irreversibly altered.

14. An integrated circuit chip according to claim 13, wherein the second conductive layer further shields the memories, the memory control logic circuit, the enabling means, and the fuse element from direct external access.

15. An integrated circuit chip according to claim 13, wherein the predetermined signal is a power signal, with the memories, the memory control logic circuit and the enabling means being powered by the predetermined power signal.

16. An integrated circuit chip according to claim 13, wherein the predetermined signal is a power signal, and wherein the first memory is a volatile memory, with the first memory being powered by the predetermined power signal.

17. An integrated circuit chip according to claim 1, wherein the shielded circuit elements comprise means for enabling said storage of secure data;

a fuse element having an initial state and an irreversibly altered state; and means coupled to the fuse element for irreversibly altering the state of the fuse element in response to a predetermined control signal;

wherein the fuse element is coupled to the enabling means so as to enable said secure data storage only prior to the state of the fuse element being irreversibly altered.

18. An integrated circuit chip according to claim 17, wherein the predetermined signal is a power signal, with the enabling means being powered by the predetermined power signal.

19. An integrated circuit chip according to claim 1, further comprising means for accessing said circuit elements for testing said circuit elements;

a fuse element having an initial state and an irreversibly altered state; and means coupled to the fuse element for irreversibly altering the state of the fuse element in response to a predetermined control signal;

wherein the fuse element is coupled to the accessing means so as to enable said access for testing only prior to the state of the fuse element being irreversibly altered.

20. An integrated circuit chip according to claim 19, wherein the predetermined signal is a power signal, with the enabling means being shielded from external access by the second conductive layer and powered by the predetermined power signal.

21. An integrated circuit chip according to claim 1, wherein the shielded circuit elements include a given circuit element that stores, processes or affects the processing of secure data;

a fuse element having an initial state and an irreversibly altered state;

means coupled to the fuse element for irreversibly altering the state of the fuse element in response to a predetermined control signal; and means coupled to the fuse element and the given circuit element for monitoring the state of the fuse element and for preventing the intended function of the given circuit element after the state of the fuse element has been altered irreversibly.

22. An integrated circuit chip according to claim 1, wherein the shielded circuit elements include a given circuit element that stores, processes or affects the processing of secure data;

a fuse element having an initial state and an irreversibly altered state;

means coupled to the fuse element for irreversibly altering the state of the fuse element in response to a predetermined control signal; and wherein the fuse element is coupled to the given circuit element so as to enable the intended function of the given circuit element only prior to the state of the fuse element being irreversibly altered.

23. An integrated circuit chip according to claim 1, wherein the shielded circuit elements further include means for generating clock signals and distributing said clock signals to the shielded circuit elements that store and/or processes secure data.

24. An integrated circuit chip according to claim 1, wherein the shielded circuit elements further include means for controlling the provision of power to the shielded circuit elements that store and/or processes secure data.

25. An integrated circuit chip according to claim 24, wherein the shielded circuit elements further include means for generating clock signals and distributing said clock signals to the shielded circuit elements that store and/or processes secure data.

* * * * *